United States Patent [19]

Cloutier et al.

[11] Patent Number: 5,333,113

[45] Date of Patent: Jul. 26, 1994

[54] METHOD AND APPARATUS FOR DETECTING, RECORDING AND USING SCENE INFORMATION IN A PHOTOGRAPHIC SYSTEM

[75] Inventors: Robert P. Cloutier, Spencerport, N.Y.; John J. Breen, Southbourough, Mass.

[73] Assignee: Eastman Kodak Company, Rochester, N.Y.

[21] Appl. No.: 494,890

[22] Filed: Mar. 9, 1990

Related U.S. Application Data

[63] Continuation of Ser. No. 380,707, Jul. 13, 1989, abandoned, which is a continuation of Ser. No. 181,935, Apr. 15, 1988, abandoned.

[51] Int. Cl.⁵ .............................................. G03B 7/16
[52] U.S. Cl. .................................. 364/525; 354/126; 354/127.1; 354/150; 354/106
[58] Field of Search .................... 364/525, 571.01; 354/410, 430, 150, 126, 127.1, 127.11, 106; 355/40

[56] References Cited

U.S. PATENT DOCUMENTS

| | | | |
|---|---|---|---|
| 3,728,947 | 4/1973 | Harnden, Jr. et al. | 95/11.5 R |
| 4,025,931 | 5/1977 | Taguchi et al. | 354/105 |
| 4,074,294 | 2/1978 | Fujita et al. | 354/106 |
| 4,079,388 | 3/1978 | Takahama et al. | 354/31 |
| 4,112,444 | 9/1978 | Yonemoto et al. | 354/106 |
| 4,114,169 | 9/1978 | Yamamori | 354/106 |
| 4,120,580 | 10/1978 | Takahashi et al. | 355/38 |
| 4,217,046 | 8/1980 | Weinstein et al. | 354/76 |
| 4,235,544 | 11/1980 | Yamada et al. | 354/106 |
| 4,327,979 | 5/1982 | Tominaga et al. | 354/105 |
| 4,361,388 | 11/1982 | Micak et al. | 354/106 |
| 4,362,369 | 12/1982 | Kazami et al. | 354/106 |
| 4,427,276 | 1/1984 | Feinerman et al. | 354/412 |
| 4,493,547 | 1/1985 | Bridges | 354/106 |
| 4,583,831 | 4/1986 | Harvey | 354/106 |
| 4,613,911 | 9/1986 | Ohta | 360/3 |
| 4,639,111 | 1/1987 | Harvey | 354/481 |
| 4,659,198 | 4/1987 | Beauviala et al. | 352/92 |
| 4,659,213 | 4/1987 | Matsumoto | 355/38 |
| 4,705,372 | 11/1987 | Lapeyre | 354/106 |
| 4,728,978 | 3/1988 | Inoue et al. | 354/106 |
| 4,736,315 | 4/1988 | Hudspeth et al. | 354/21 |
| 4,746,207 | 5/1988 | Selin | 352/90 |
| 4,751,546 | 6/1988 | Yamamoto et al. | 354/106 |
| 4,780,735 | 10/1988 | Taniguchi et al. | 354/202 |

FOREIGN PATENT DOCUMENTS 197712 12/1977 Fed. Rep. of Germany.

OTHER PUBLICATIONS

The Kodak Workshop Series, *Existing-Light Photography* (Eastman-Kodak Company, 1987), pp. 53-62, 68-69, 74-75.

Pincus et al., *The Filmmaker's Handbook* (New American Library, 1984), pp. 258-259.

*Primary Examiner*—Vincent N. Trans
*Attorney, Agent, or Firm*—Francis H. Boos, Jr.

[57] ABSTRACT

A method of operating a photographic camera to record data in correspondence with a picture frame includes activating a flash to provide illumination for exposing the picture frame onto a photographic film. Sensing is performed to determine if light generated by the flash is reflected from a subject in the picture frame. Data is recorded in association with the picture frame indicating if reflected light is sensed. In accordance with a method of operating a photographic printer to print a negative frame, the reflected flash illumination data associated with the negative frame is read. An appropriate exposure for the negative frame is selected based at least in part on the presence or absence of the sensed reflected flash illumination.

21 Claims, 3 Drawing Sheets

METHOD AND APPARATUS FOR DETECTING, RECORDING AND USING SCENE INFORMATION IN A PHOTOGRAPHIC SYSTEM

This application is a continuation, of application Ser. No. 07/380,707, filed Jul. 13, 1989, now abandoned. Which is a continuation, of application Ser. No. 181,935, filed Apr. 15, 1988 now abandoned.

The present invention relates generally to recording scene information in association with exposed photographic film, and more particularly to recording data indicating the sensing of returned flash illumination in association with each picture frame on a photographic film for subsequent use in printing developed negatives.

BACKGROUND OF THE INVENTION

It is known in the art to record latent image data on photographic film in association with exposed, latent image picture frames. Such data can include, for example, time/date information which is subsequently developed with the latent image and printed on the final print.

It is further known in the art to record latent image data which can be used in printing developed negative frames. U.S. Pat. No. 4,493,547 to Bridges (assigned to the assignee of the present invention), for example, shows apparatus for recording a vertical/horizontal camera orientation on the film in association with each picture frame. Such information can be used, for example, during the printing process to aid in identifying a main subject and calculating an appropriate color printing exposure.

U.S. Pat. No. 4,079,388 to Takahama et al. shows apparatus for use in a camera which functions to distinguish between natural daylight, fluorescent light, and tungsten light in a picture scene. The apparatus further functions to mark the film with a latent image identifying the light type. During printing, the exposed marks on the film are read to determine the type of light present in each negative frame. This information is used in calculating appropriate printing exposures for the negative frames.

Many printers in use today operate automatically, i.e. without human intervention, to calculate an appropriate printing exposure for each individual negative frame. These printers typically scan each negative frame to measure color densities, and, based on pre-programmed algorithms, identify a primary subject, classify the negative frame as a particular type (i.e. back-lit), or make some similar decision regarding the negative frame content. Based on this decision or decisions, an appropriate printing exposure is calculated.

One disadvantage in the printing operation described above is that, operating without human intervention, photographic printers can be "fooled" into making improper decisions regarding negative frames. Improperly identifying a subject, misclassifying a negative type, or otherwise making an error in examining a negative frame often results in the calculation of an improper printing exposure.

SUMMARY OF THE INVENTION

A principle object of the present invention is to make more information regarding the scene content of individual negative frames available for use during the printing process, whereby appropriate printing exposures can be more consistently calculated for each print.

Another object of the present invention is to provide information regarding the detection of reflected flash illumination for use during the printing process.

A further object of the present invention is to provide a method and apparatus, for use in a photographic camera, for sensing reflected flash illumination and recording the sensing of such illumination in association with each corresponding picture frame.

Yet another object of the present invention is to provide a method and apparatus, for use in a photographic printing system, for determining if reflected flash illumination was sensed in association with a particular negative frame, and calculating a printing exposure accordingly.

In accordance with a first embodiment of the present invention, a new and improved method of operating a photographic camera is provided for recording flash-related data in correspondence with a picture frame. This method includes the steps of:
(1) activating a flash to provide illumination for exposing the picture frame onto a photographic film;
(2) sensing to determine if light generated by the flash is reflected from a subject in the picture frame; and
(3) recording data in association with the picture frame indicating if reflected light is sensed.

In accordance with a second embodiment of the present invention, a new and improved method is provided for operating a photographic printing system which utilizes the flash-related data to print a negative frame onto photosensitive paper. This method comprises the steps of:
(1) reading data associated with the negative frame to determine if reflected flash illumination was sensed during the exposure of the negative frame; and
(2) selecting an appropriate exposure for the negative frame, this selecting step being based at least in part on the presence or absence of the sensed reflected flash illumination.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing Figures, in which:

DETAILED DESCRIPTION OF THE INVENTION

Figure 1:
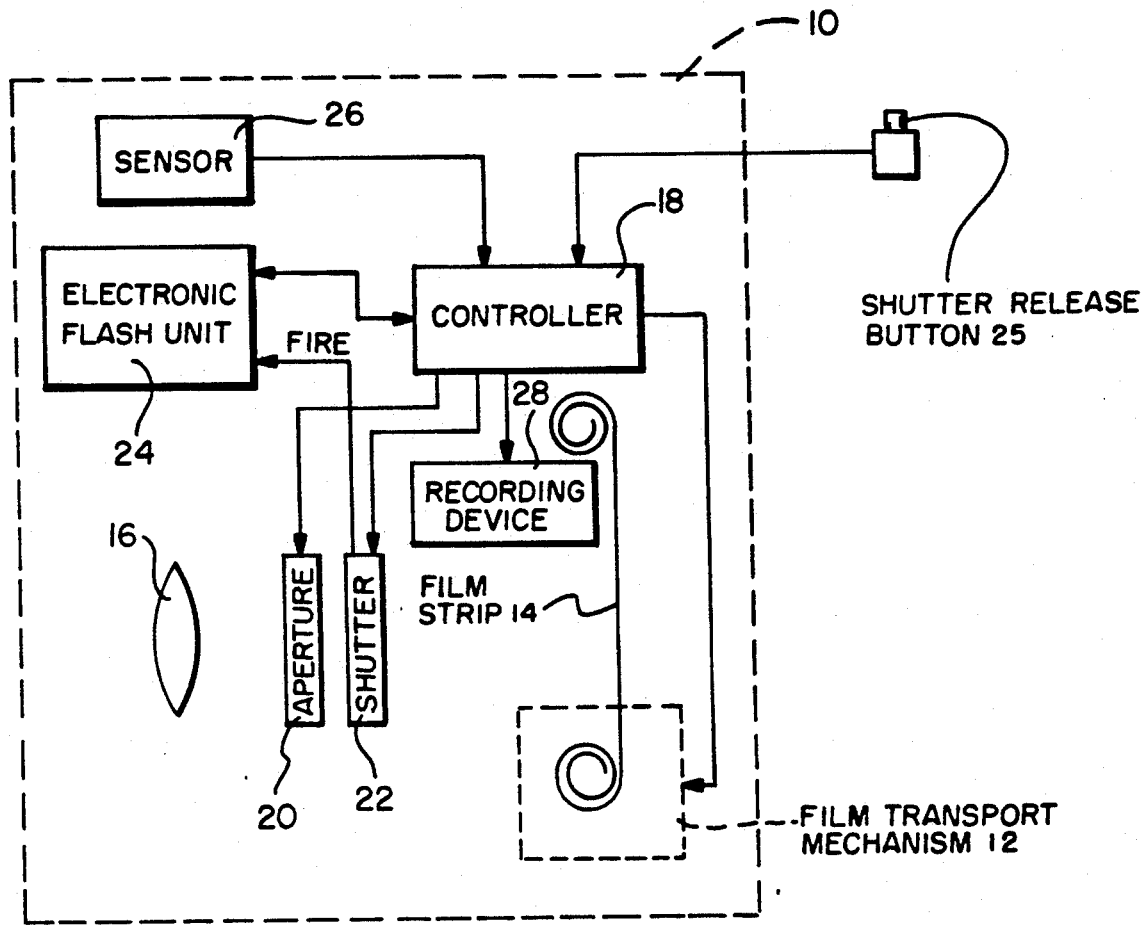
FIG. 1 is a schematic view of a photographic camera constructed in accordance with the present invention.

Referring now to the drawings, FIG. 1 shows a photographic camera 10 including a film transport mechanism 12 for supporting and advancing a silver halide film strip 14. A lens 16, aperture mechanism 20, and shutter mechanism 22 are positioned to control the exposure of picture frames onto film strip 14. As used herein, a "picture frame" comprises an undeveloped, latent image scene. A controller 18, for example a microprocessor, is connected to the aperture and shutter mechanisms 20, 22, and to film transport mechanism 12. An electronic flash unit 24 is connected to controller 18 for communicating charge and operational status data therewith, and to shutter 22 for receiving a "FIRE" signal so as to be activated. A shutter release button 25 is connected to controller 18, operation of the shutter release button causing the controller to set aperture 20 and actuate shutter 22. The above-described components represent conventional components known to those possessing ordinary skill in the art, and will not be discussed in detail.

Camera 10 further includes a sensor 26 and a recording device 28, both connected to controller 18. Sensor 26 is selected and positioned so as to sense any illumination generated by flash 24 and reflected back from a subject (not shown) in a picture scene. Recording device 28 is positioned adjacent film 14 so as to record data on the film.

Sensor 26 comprises a conventional light sensor selected for its sensitivity to illumination at the color temperature of the illumination generated by flash 24. A typical color temperature for electronic flash illumination is in the range of 5,000–6,000 degrees Kelvin. If camera 10 comprises an autoexposure type camera (many of which are well known in the art), sensor 26 can function both as a sensor for calculating exposure and for sensing returned flash illumination in a manner described below. Recording device 28 comprises one of many devices suitable for recording data on film 14. Such devices include, for example, means such as an LED or a light pipe for exposing a latent image onto film 14, a mechanical marking device such as a punch for mechanically marking the film, and a magnetic head for magnetically encoding data onto the film (used if film 14 includes a magnetically coated region).

Figure 2:
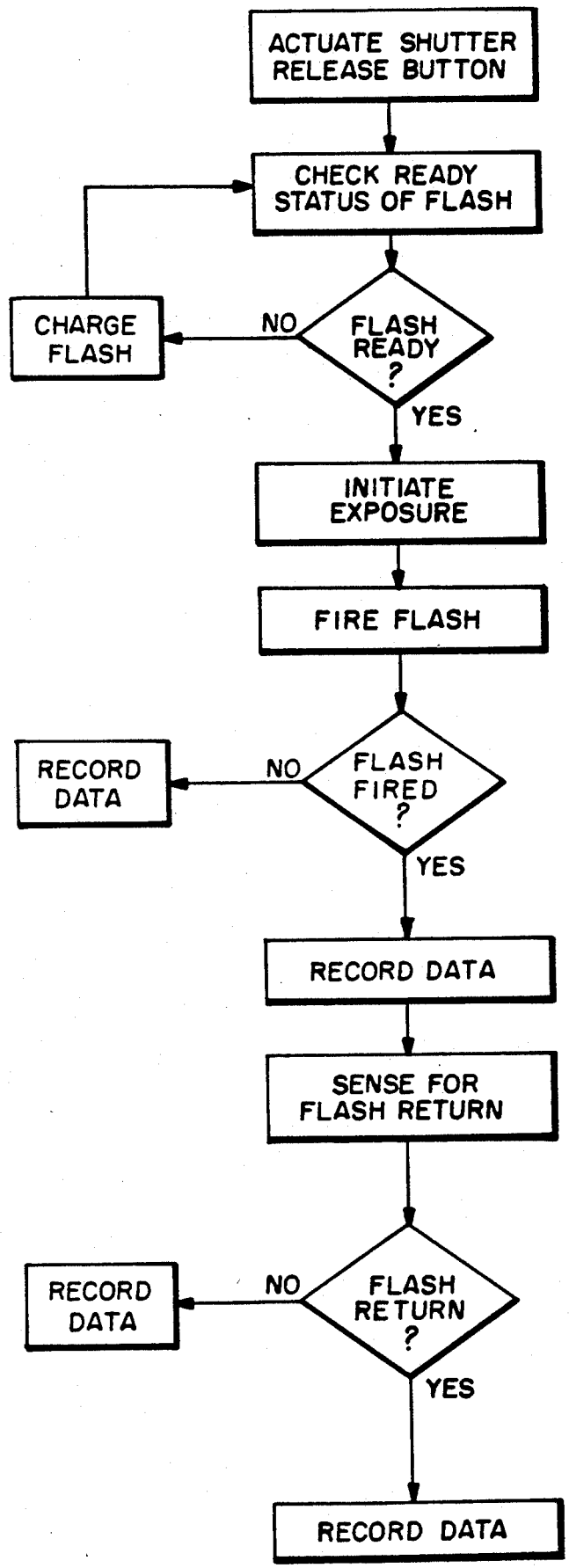
FIG. 2 is a flow chart illustrating a method of operating a camera in accordance with the present invention.

In operation, described with respect to the flow chart in FIG. 2, a user (not shown) actuates shutter release button 25 to initiate an exposure of a picture frame onto film 14. In actual operation, controller 18 may or may not condition flash 24 for firing, depending on ambient lighting conditions and input from the user. However, for purposes of describing the invention, it will be assumed that the operation of flash 24 is desired. Controller 18 thus checks the status of flash 24 to determine if it is charged, and initiates charging or an exposure accordingly. In initiating the exposure, controller 18 sets aperture 20, and activates shutter 22. As shutter 22 opens, it in turn generates a signal triggering the firing of flash 24. Controller 18 then senses the ready status of flash 24 to determine if flash 24 actually did fire, and activates recording device 28 to record the firing or non-firing of the flash on film 14.

If it is determined that flash 24 has fired, controller 18 monitors sensor 26 to determine if flash illumination is reflected and hence returned from a subject (not shown) in the picture scene. The results of the flash return, i.e. flash returned or not returned, is recorded on film 14 via controller 18 and recording device 28.

It will be understood that the data need not be recorded coincident with the exposure of each individual frame. The data may, for example, be stored in controller 18, and recorded on film 14 during a rewind operation. The data may be recorded on a leading or trailing end of film 14, or on a cartridge associated with the film. The data may also be placed on the non-emulsion side of film 14.

It will be further understood that it is not necessary to the practice of the invention to record data indicating whether the flash did or did not fire. Significant information for subsequent printing can be derived from recording the flash return data alone.

Figure 3:
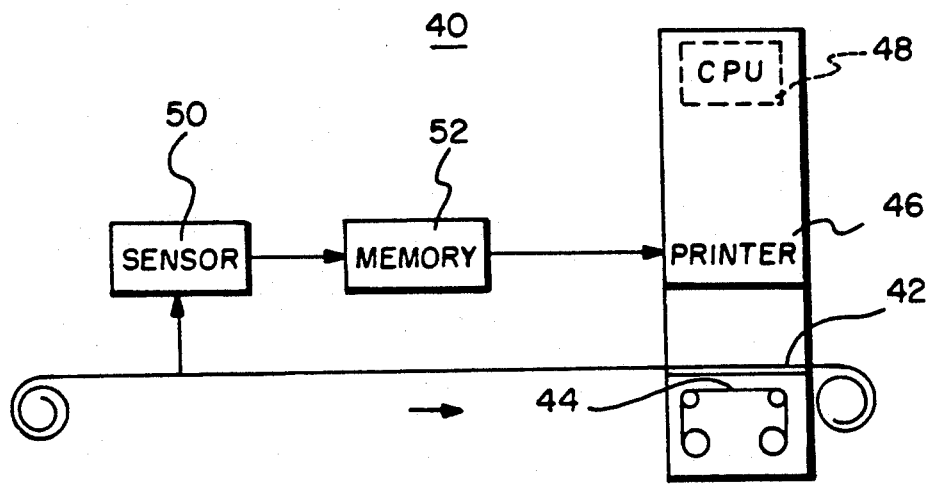
FIG. 3 is a schematic view of a photographic printing system constructed in accordance with the present invention.

Referring now to FIG. 3, a printing system 40 is shown for printing a developed strip 42 of photographic negative frames onto a roll 44 of photographic paper. As used herein, "negative frame" refers to a developed image scene. Printing system 40 includes a conventional photographic printer 46, including a computer (CPU) 48 for calculating and controlling exposure times for black and white negatives or each of the colors in a color negative. As is known in the art, CPU 48 calculates printing exposures in accordance with a pre-programmed printing algorithm. Such a printing algorithm typically includes scene-specific sub-algorithms, selected in accordance with decisions made after analyzing a negative and/or the information provided with a negative. It will be understood that many different algorithms and sub-algorithms are known in the art for printing photographic negatives, and the particular ones used are not a part of the present invention.

To operate in accordance with the present invention, printing system 40 further includes a sensor 50 positioned upstream of printer 46, relative to the motion of negative strip 42, for sensing 'flash fired' and/or 'flash returned' data recorded on the negative strip. This data is, of course, of the type described hereinabove with respect to FIGS. 1 and 2, and sensor 50 is chosen as an optical, mechanical or magnetic type sensor to correspond to the type of recording device 28 employed for recording the data on the film. Because sensor 50 is positioned upstream of printer 46, appropriate data memory circuitry 52 is provided for synchronizing the data measured by the sensor with the negative frame being printed in printer 46. Alternatively, sensor 50 can be positioned directly within printer 46 for sensing the data related to the negative frame being printed.

For purposes of explaining the operation of printing system 40, it will be assumed that both the 'flash fired' and 'flash returned' data are recorded on negative strip 42 (though, as described above, the latter can be provided without the former).

Figure 4:
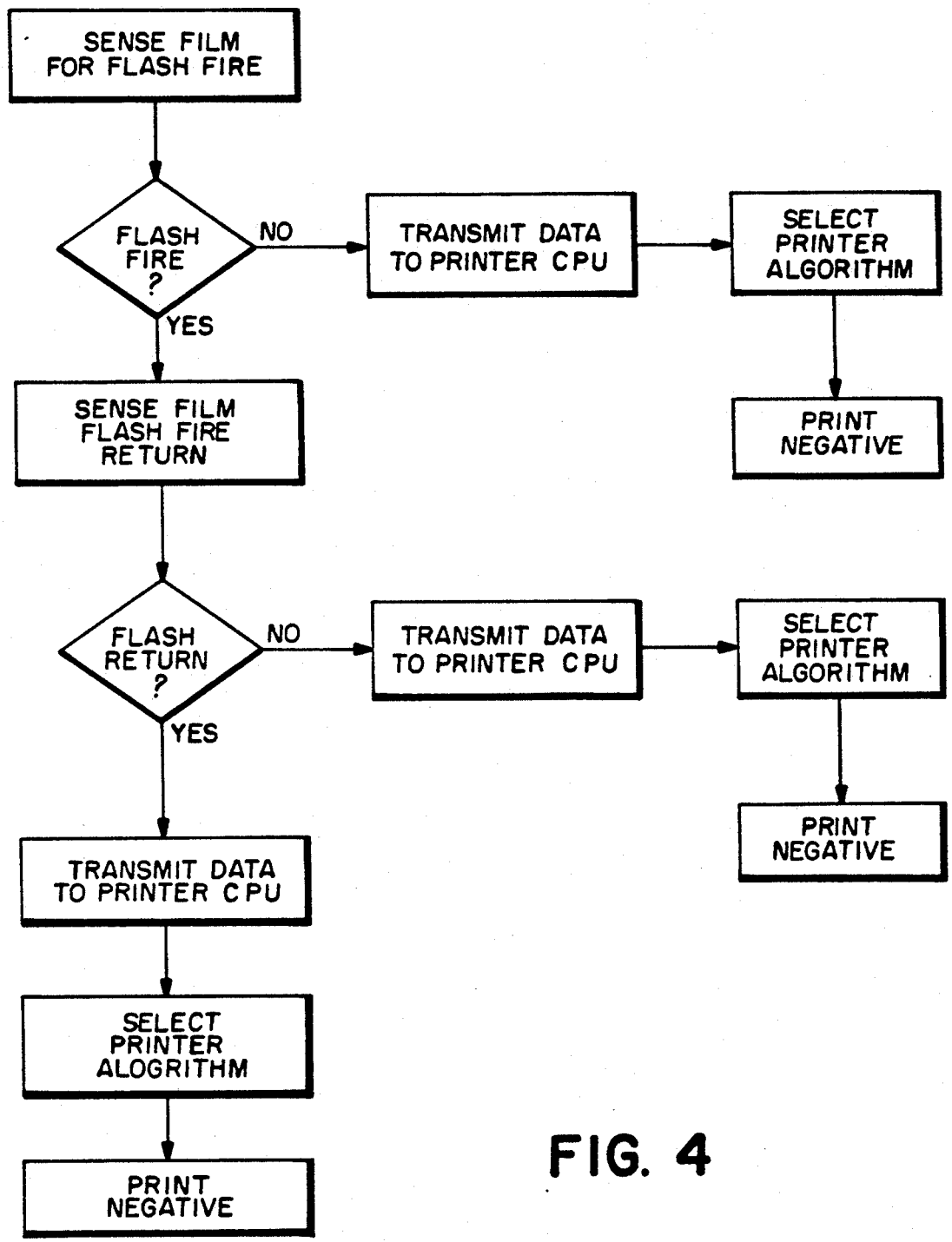
FIG. 4 is a flow chart illustrating a method of operating a photographic system in accordance with the present invention.

Accordingly, in operation, described with respect to the flow chart of FIG. 4, sensor 50 senses to determine if a flash was fired during the exposure of a particular negative frame to be printed. If no flash was fired, this data is transmitted through memory 52 to CPU 48 of printer 46, and, when the negative reaches the printer, it is printed using the non-flash sub-algorithm.

Continuing to describe the operation of printing system 40, if sensor 50 senses that a flash was fired, it then senses the data recorded to indicate whether flash illumination was returned from a subject in the negative scene. If no returned flash illumination was sensed when the picture scene was exposed onto film strip 42, this information is transmitted to printer CPU 48. CPU 48 then knows that a flash was fired, but no return flash illumination was sensed. CPU 48 uses this data to select a specifically provided sub-algorithm for optimally exposing the negative frame.

If the recorded data indicates that flash return illumination was sensed during the exposure of the picture frame, this data is transmitted to CPU 48. CPU 48 then knows both that a flash was fired, and that return flash illumination was sensed. CPU 48 uses this data to select a specifically provided sub-algorithm for optimally exposing the negative frame.

As mentioned above, it is not necessary to sense both 'flash fired' and 'flash returned' data in the practice of the invention. Sensing only the 'flash returned' data is sufficient to provide information for CPU 48 which will permit the calculation of a more optimal printing exposure than would be possible without that data. Further sensing the 'flash fired' data may permit the calculation of an even better printing exposure, particularly in those instances where it is determined that the flash was fired but not returned.

There is thus provided a method and apparatus for recording data in relation to an exposed picture frame on a negative strip indicating if a flash was fired, and flash illumination returned, in the exposure of that picture frame. Further provided is a method and apparatus for reading this data from a developed negative strip and using the data in a photographic printing system to calculate optimal exposures for each negative frame.

While preferred embodiments of the invention have been illustrated and described, it will be clear that the invention is not so limited. Numerous modifications, changes, variations, substitutions and equivalents will occur to those skilled in the art without departing from the spirit and scope of the present invention.

What is claimed is:

1. A method of operating a photographic camera to record data relating to flash illumination in correspondence with recording a latent image of a subject onto a picture frame of a photographic film, comprising the steps of:
   actuating a shutter to expose said frame to record said image;
   triggering an electronic flash to provide flash illumination during said exposure;
   sensing to determine if said triggered flash is fired;
   sensing to determine if illumination generated by said flash firing is reflected back from said subject during said exposure; and
   in response to sensing said firing of said flash, recording data on said film in association with said frame to indicate if said reflected illumination is sensed.

2. A method in accordance with claim 1 wherein the color temperature for said flash illumination is in the range of 5,000–6,000 degrees Kelvin.

3. A method in accordance with claim 1, further comprising the step of recording data on said film in association with said frame to indicate if said firing of said flash is sensed.

4. A method in accordance with claim 3 wherein said recording steps comprise exposing latent image data onto said photographic film.

5. A method in accordance with claim 3 wherein said recording steps comprise recording magnetically coded data onto said photographic film.

6. A method in accordance with claim 3 wherein said recording steps comprise mechanically coding data onto said photographic film.

7. A method of operating a photographic camera to record data relating to flash illumination in correspondence with recording a latent image of a subject onto a picture frame of a photographic film, comprising the steps of:
   actuating a shutter to expose said frame to record said image;
   triggering an electronic flash in response to said shutter actuation;
   sensing to determine if said triggered flash is fired;
   in response to sensing said firing of said flash, sensing to determine if illumination generated by said flash is returned back from said subject during said exposure; and
   recording data on said film in association with said frame to indicate said sensing of the return or non-return of said illumination.

8. A method in accordance with claim 7, further comprising the step of recording data on said film in association with said frame to indicate the firing or non-firing of said flash.

9. In a photographic camera adapted to record data in correspondence with recording a latent image of a subject onto a picture frame of a photographic film, said camera including an electronic flash, means for exposing said frame to record said image, and means for triggering said flash to provide flash illumination during said exposure, apparatus comprising:
   first sensing means, connected with said flash, for determining if said flash, triggered by said triggering means, is fired;
   second sensing means, responsive to the firing of said flash sensed by said first sensing means, for determining if illumination generated by said flash is reflected back from said subject during operation of said frame exposing means to expose said frame; and
   recording means, connected with said second sensing means, for recording data on said film in association with said frame to indicate if said reflected illumination is sensed.

10. Apparatus in accordance with claim 9 wherein said flash provides illumination having a color temperature in the range of 5,000 to 6,000 degrees Kelvin.

11. Apparatus in accordance with claim 9, further comprising
   second recording means, connected to said first sensing means, for recording data on said film in association with said frame to indicate if said firing is sensed.

12. Apparatus in accordance with claim 11 wherein said recording means comprises means for recording a latent image on said photographic film.

13. Apparatus in accordance with claim 11 wherein said recording means comprises means for recording magnetically coded data on said photographic film.

14. Apparatus in accordance with claim 11 wherein said recording means comprises means for mechanically coding data onto said photographic film.

15. In a photographic camera adapted to record data in correspondence with recording a latent image of a subject onto a picture frame of a photographic film, said camera including an electronic flash, a shutter, means for actuating said shutter for exposing said frame to record said image, and means for triggering said flash in response to actuation of said shutter, apparatus comprising:
   first sensing means, connected with said flash, for determining if said flash, triggered by said triggering means, is fired;
   second sensing means, connected to said first sensing means and responsive to sensing said firing of said flash, for determining if illumination generated by said flash is returned back from said subject; and
   recording means, connected with said second sensing means, for recording data on said film in association with said frame to indicate the sensing by said second sensing means of the return or non-return of said illumination.

16. Apparatus in accordance with claim 15, wherein said recording means is further connected to said first sensing means, and further comprises means for recording data on said film in association with said frame to indicate the firing or non-firing of said flash.

17. A method of exposing and printing a picture frame of a photographic film, comprising the steps of:

actuating a camera to expose said frame to record a latent image of a subject;

triggering an electronic flash during said exposure;

sensing to determine if said triggered flash fired;

sensing to determine if illumination generated by said flash firing is returned back from said subject during said exposure;

in response to sensing said firing of said flash, recording data on said film in association with said frame to indicate the return or non-return of said illumination;

developing said film to produce a negative image from said latent image;

sensing said data from said film to determine if said flash illumination was returned back from said subject during said exposure; and actuating a printing system to print said negative image onto a photosensitive medium in accordance with print parameters automatically chosen at least in part based on said sensed data.

18. A method in accordance with claim 17, wherein said data is first data, and further comprising the steps of recording second data on said film to indicate the firing or non-firing of said flash; wherein said data sensing step comprises sensing said first and second data from said film to determine if said flash was fired and if said flash illumination was returned back from said subject; and wherein said, printing system actuating step comprises actuating said system in accordance with print parameters based at least in part on said sensed first and second data.

19. A method in accordance with claim 18 wherein said reading steps comprise reading developed latent image data.

20. A method in accordance with claim 18 wherein said reading steps comprise reading magnetically coded data.

21. A method in accordance with claim 18 wherein said reading steps comprise reading mechanically coded data.

* * * * *